(12) United States Patent
Wang et al.

(10) Patent No.: US 12,440,091 B2
(45) Date of Patent: Oct. 14, 2025

(54) INSERTION PART OF ELECTRONIC ENDOSCOPE AND ELECTRONIC ENDOSCOPE

(71) Applicant: HOTWIRE MEDICAL TECH. DEVELOPMENT CO., LTD., Beijing (CN)

(72) Inventors: Chong Wang, Beijing (CN); Shibo Fu, Beijing (CN); Yong Fu, Beijing (CN)

(73) Assignee: HOTWIRE MEDICAL TECH. DEVELOPMENT CO., LTD., Beijing (CN)

( * ) Notice: Subject to any disclaimer, the term of this patent is extended or adjusted under 35 U.S.C. 154(b) by 522 days.

(21) Appl. No.: 17/289,341

(22) PCT Filed: Feb. 28, 2019

(86) PCT No.: PCT/CN2019/076585
§ 371 (c)(1),
(2) Date: Apr. 28, 2021

(87) PCT Pub. No.: WO2020/087821
PCT Pub. Date: May 7, 2020

(65) Prior Publication Data
US 2021/0361143 A1     Nov. 25, 2021

(30) Foreign Application Priority Data

Nov. 1, 2018  (CN) .......................... 201811296593.5

(51) Int. Cl.
*A61B 1/005*   (2006.01)
*A61B 1/00*    (2006.01)

(52) U.S. Cl.
CPC ........ *A61B 1/0055* (2013.01); *A61B 1/00133* (2013.01)

(58) Field of Classification Search
CPC .............. A61B 1/0055; A61B 1/00133; A61B 1/00066; A61B 1/00071; A61B 1/00105;
(Continued)

(56) References Cited

U.S. PATENT DOCUMENTS

2005/0137455 A1* 6/2005 Ewers .................. A61B 1/0052
                                                      600/114
2015/0359420 A1* 12/2015 Hatase ................. A61B 1/0055
                                                      600/110

FOREIGN PATENT DOCUMENTS

CN       1817596 A      8/2006
CN       1899212 A  *   1/2007   ........... A61B 1/0016
(Continued)

*Primary Examiner* — Michael J Carey
*Assistant Examiner* — Timothy Tuan Luu
(74) *Attorney, Agent, or Firm* — SALIWANCHIK, LLOYD & EISENSCHENK

(57) ABSTRACT

The present invention relates to an instrument for inspecting a cavity or a tract of a human body in a visual or photographing mode, in particular to an insertion part of an electronic endoscope and the electronic endoscope. The electronic endoscope comprises an operation part and the insertion part which are detachably connected, a plurality of operation part rack guide rollers in the operation part are arrayed in the fore-aft direction of an operation part shell, operation part racks are slidably supported on the plurality of operation part rack guide rollers, and the operation part racks and the connection portion racks are detachable. In this way, the insertion part of the electronic endoscope can be made into a disposable part to eliminate cross infection among patients.

6 Claims, 3 Drawing Sheets

(58) Field of Classification Search
CPC . A61B 1/0057; A61B 1/0052; A61B 1/00103; A61B 1/00142; A61B 1/0016; A61B 1/005; A61B 1/0051
USPC .................................................. 600/146, 149
See application file for complete search history.

(56) References Cited

FOREIGN PATENT DOCUMENTS

| CN | 106999017 A | * | 8/2017 | ......... A61B 1/00068 |
|----|----|----|----|----|
| CN | 108420390 A | | 8/2018 | |
| DE | 10034105 C1 | * | 4/2002 | ........... A61B 1/0052 |
| KR | 20190121498 A | * | 10/2019 | |
| WO | WO-2007086743 A2 | * | 8/2007 | ........... A61B 1/0008 |
| WO | WO-2016136301 A1 | * | 9/2016 | ......... A61B 1/00009 |
| WO | WO-2018098465 A1 | * | 5/2018 | ......... A61B 1/00009 |
| WO | WO-2019003586 A1 | * | 1/2019 | ........... A61B 1/0052 |

\* cited by examiner

INSERTION PART OF ELECTRONIC ENDOSCOPE AND ELECTRONIC ENDOSCOPE

CROSS REFERENCE TO RELATED APPLICATIONS

This application is a National Stage of International Application No. PCT/CN2019/076585, filed on Feb. 28, 2019, which claims priority to Chinese Patent Application No. 201811296593.5, filed on Nov. 1, 2018; both of which are hereby incorporated by reference in their entireties.

TECHNICAL FIELD

The present invention relates to an instrument for inspecting a cavity or a tract of a human body in a visual or photographing mode, in particular to an insertion part of an electronic endoscope and the electronic endoscope.

BACKGROUND

An electronic endoscope is a common medical instrument, which can observe lesions on tissues and organs within a human body, such as stomach, esophagus and duodenum through natural pores of the human body, thereby assisting the doctors in carrying out the accurate diagnosis for the patient's pathogenic conditions. The hygiene and safety problems of the electronic endoscope have been particularly significant due to the fact that it needs to enter the human body. Hence, if a part, inserted into the human body, of a front end of the electronic endoscope is designed to be separable from a rear end thereof, the front end thereof may be made into into a disposable part to eliminate cross infection between patients due to incomplete sterilization of the front end thereof.

However, for existing electronic endoscopes, a transmission for driving a bending portion with a camera at the front end to bend is mostly driven by a chain. This transmission method limits the implementation of designing the part, inserted into the human body, of the front end of the electronic endoscope to be separable from the rear end thereof. After a structure is added on the electronic endoscope based on chain transmission, the operability decreases, the operating performance gets worse, the weight increases and the cost gets higher.

Accordingly, it is urgent to solve the difficulty of designing the part, inserted into the human body, of the front end of the electronic endoscope to be separable from the rear end thereof.

SUMMARY

(I) Technical Problems to be Solved

The present invention provides an insertion part of an electronic endoscope which is conducive to the implementation of designing a part, inserted into a human body, of a front end of the electronic endoscope to be separable from a rear end thereof, and the electronic endoscope with the part, inserted into the human body, of the front end designed to be separable from the rear end thereof.

(II) Technical Solution

According to one aspect, the present invention provides an insertion part of an electronic endoscope, the insertion part comprising a connection portion, a main hose and a bending portion which are connected sequentially, a front end of the bending portion is provided with a camera, and the connection portion comprises a connection portion shell and a connection portion transmission located in the connection portion shell, wherein a rear end of the connection portion shell can be detachably connected with an operation part of the electronic endoscope, and a front end of the connection portion shell is connected with a rear end of the main hose; the connection portion transmission comprises connection portion racks as well as a connection portion gear and a connection portion rack guide roller set which are respectively located at opposite sides of the connection portion racks, the connection portion gear is rotatably supported in the connection portion shell, and the connection portion racks are engaged with the connection portion gear; the connection portion rack guide roller set comprises a plurality of connection portion rack guide rollers which are arrayed in a fore-aft direction of the connection portion shell and are rotatably supported in the connection portion shell, and the connection portion racks are slidably supported on the connection portion rack guide rollers; and the connection portion racks are connected with control ropes, and the control ropes pass through the main hose and are connected with the connection portion racks and the bending portion in such manner of converting fore-aft movement of the connection portion racks into bending of the bending portion.

According to the present invention, the connection portion transmission further comprises connection portion roller supporting grooves secured in the connection portion shell, and the plurality of connection portion rack guide rollers are rotatably supported in the connection portion roller supporting grooves; for the plurality of connection portion rack guide rollers, a distance between the two connection portion rack guide rollers located at front and rear ends covers a stroke of the connection portion racks; and the connection portion rack guide rollers are bearings, each bearing has an inner diameter of an inner race as 1.5 mm, an outer diameter of an outer race as 3 mm and a thickness as 3 mm, and a distance between every two adjacent bearings is in a range of 10 to 20 mm.

According to the present invention, the connecting portion (2) further comprises: a first limiting member of the connection portion and a second limiting member of the connection portion secured in the connection portion shell, the first limiting member of the connection portion and the second limiting member of the connection portion are respectively located at rear and front sides of the connection portion gear and define the connection portion racks to move in a fore-aft moving direction.

According to the present invention, the first limiting member of the connection portion and/or the second limiting member of the connection portion are rollers rotatably supported in the connection portion shell, the axes of the rollers are parallel to an axis of the connection portion gear and are equally distant from the connection portion racks, and the outer diameters of the rollers are equal to a diameter of a dedendum circle of the connection portion gear.

According to the present invention, the first limiting member of the connection portion and/or the second limiting member of the connection portion are bearings, each bearing has an inner diameter of an inner race as 4 mm, an outer diameter of an outer race as 12 mm, and a thickness as 4 mm.

According to the other aspect, the present invention provides an electronic endoscope, comprising an operation part and any of the above-mentioned insertion parts; the operation part comprises an operation part shell, an operation part transmission located in the operation part shell and a hand wheel arranged on the operation part shell, wherein a front end of the operation part shell is detachably connected with a rear end of the connection portion shell; the operation part transmission comprises operation part racks as well as an operation part gear and an operation part rack guide roller set which are respectively located at opposite sides of the operation part racks, the hand wheel and the operation part gear are connected in such a manner of converting the rotation of the hand wheel into the rotation of the operation part gear, the operation part gear is rotatably supported in the operation part shell, and the operation part racks are engaged with the operation part gear; the operation part rack guide roller set comprises a plurality of operation part rack guide rollers which are arrayed in a fore-aft direction of the operation part shell and are rotatably supported in the operation part shell, the operation part racks are slidably supported on the operation part rack guide rollers, and the operation part racks and the connection portion racks are connected in detachable and transferable fore-aft moving modes.

According to the present invention, the operation part transmission further comprises operation part roller supporting grooves secured in the operation part shell, and the plurality of operation part rack guide rollers are rotatably supported in the operation part roller supporting grooves; for the plurality of operation part rack guide rollers, a distance between the two operation part rack guide rollers located at front and rear ends covers a stroke of the operation part racks; and the operation part rack guide rollers are bearings, each bearing has an inner diameter of an inner race as 1.5 mm, an outer diameter of an outer race as 3 mm and a thickness as 3 mm, and a distance between every two adjacent bearings is in a range of 10 to 20 mm.

According to the present invention, the operation part further comprising: a first limiting member of the operation part and a second limiting member of the operation part secured in the operation part shell, the first limiting member of the operation part and the second limiting member of the operation part are respectively located at the rear and front sides of the operation part gear and define the operation part racks to move in a fore-aft moving direction.

According to the present invention, the first limiting member of the operation part and/or the second limiting member of the operation part are rollers rotatably supported in the operation part shell, the axes of the rollers are parallel to an axis of the operation part gear and equally distant from the operation part racks, and the outer diameters of the rollers are equal to a diameter of a dedendum circle of the operation part gear.

According to the present invention, the first limiting member of the operation part and/or the second limiting member of the operation part are bearings, each bearing has an inner diameter of an inner race as 4 mm, an outer diameter of an outer race as 12 mm and a thickness as 4 mm.

(III) Beneficial Effects

In the insertion part of the electronic endoscope according to the present invention, the transmission in the part, inserted into the human body, of the front end of the electronic endoscope is replaced by the matching of the racks and the gear, and the transmission in the rear end part may be provided correspondingly. This is beneficial for the implementation of separable design between the front and rear parts of the electronic endoscope. In this way, the front end part of the electronic endoscope can be made into a disposable part to eliminate cross infection between patients.

Further, in the insertion part of the electronic endoscope according to the present invention, the racks are used as a part detachably connected with the transmission in the rear end part, which is simple in structure and high in connection precision relative to chain transmission.

Further, the connection portion racks in the insertion part of the electronic endoscope according to the present invention form rolling friction with the part for limiting a movement direction thereof, thereby being conducive to controlling operation power and improving operation precision and reliability, in order to improve the operation feeling and overall treatment effect of the electronic endoscope.

In the electronic endoscope provided by the present invention, the racks and the gears are matched for the transmissions in the operation part and the insertion part, and the operation part racks in the operation part and the connection portion racks in the insertion part are connected in detachable and transferable fore-aft moving modes, thus implementing the separable design between the operation part and the insertion part of the electronic endoscope. In this way, the insertion part of the electronic endoscope can be made into a disposable part to eliminate cross infection between patients.

Further, the racks are used as connection parts in the operation part and the insertion part of the electronic endoscope according to the present invention, which is simple in structure and high in connection precision relative to the chain transmission.

Further, in the electronic endoscope according to the present invention, the operation part racks and the connection portion racks form rolling friction with the parts for limiting the movement direction thereof, thereby being conducive to controlling operation power and improving operation precision and reliability with respect to a hand wheel, in order to improve the operation feeling and overall treatment effect of the electronic endoscope.

APPENDED DRAWING REFERENCE SIGNS

1: operation part; 11: operation part shell; 12: first limiting member of operation part; 13: operation part rack; 14: operation part rack guide roller; 15: operation part gear; 16: operation part roller supporting groove; 17: second limiting member of operation part; 2: connection portion; 21: connection portion shell; 22: first limiting member of connection portion; 23: connection portion rack; 24: connection portion rack guide roller; 25: connection portion gear; 26: connection portion roller supporting groove; 27: second limiting member of connection portion; 28: control rope; 29: pipe inlet; 3: main hose; 4: bending portion; 5: connection member.

DETAILED DESCRIPTION OF EMBODIMENTS

For the purpose of explaining the present invention better for understanding, the present invention will be elaborated below by combining the drawings with the specific implementations.

Figure 1:
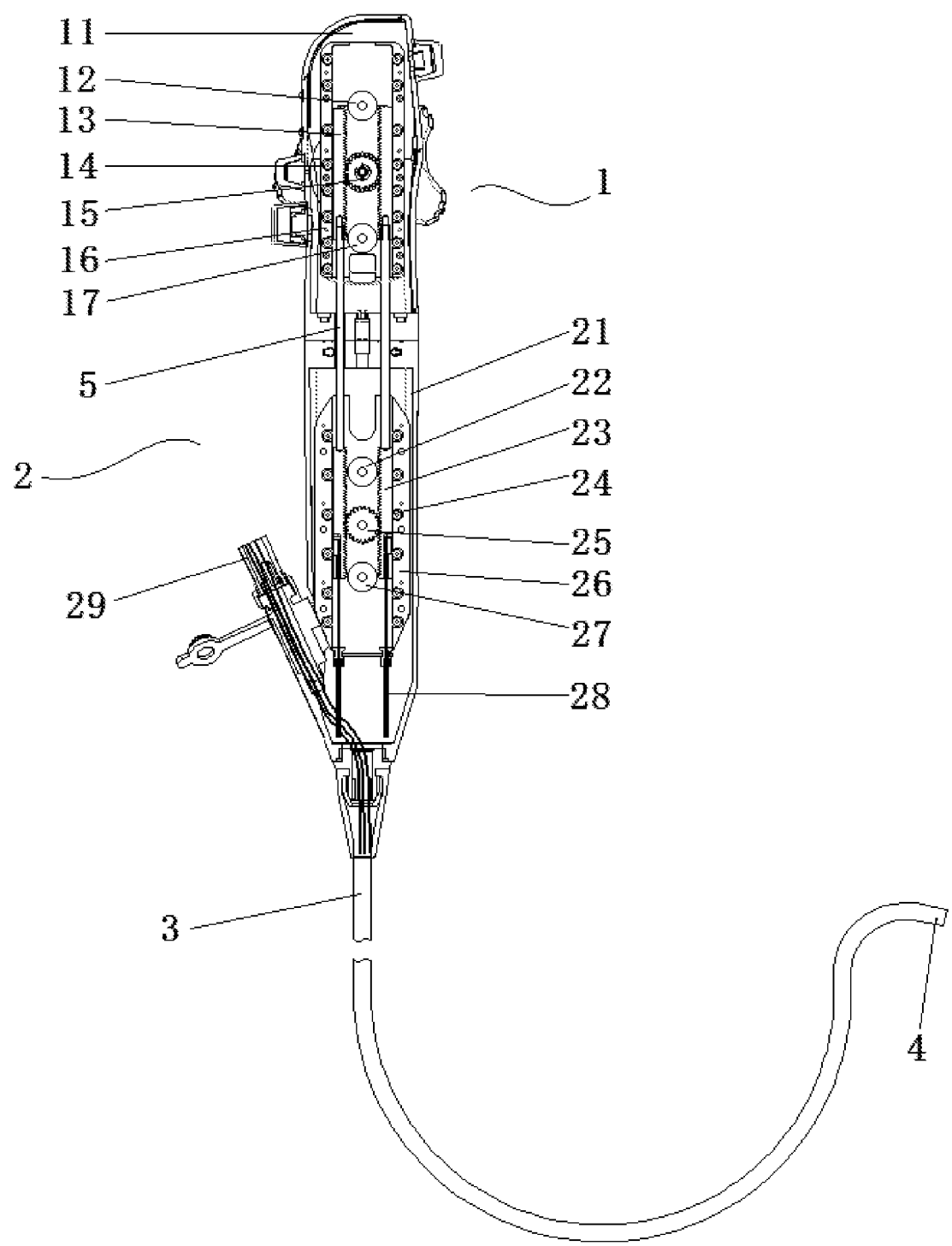
FIG. 1 is a schematic diagram of an inner structure of one embodiment of an electronic endoscope provided by a specific implementation of the present invention.
Figure 2:
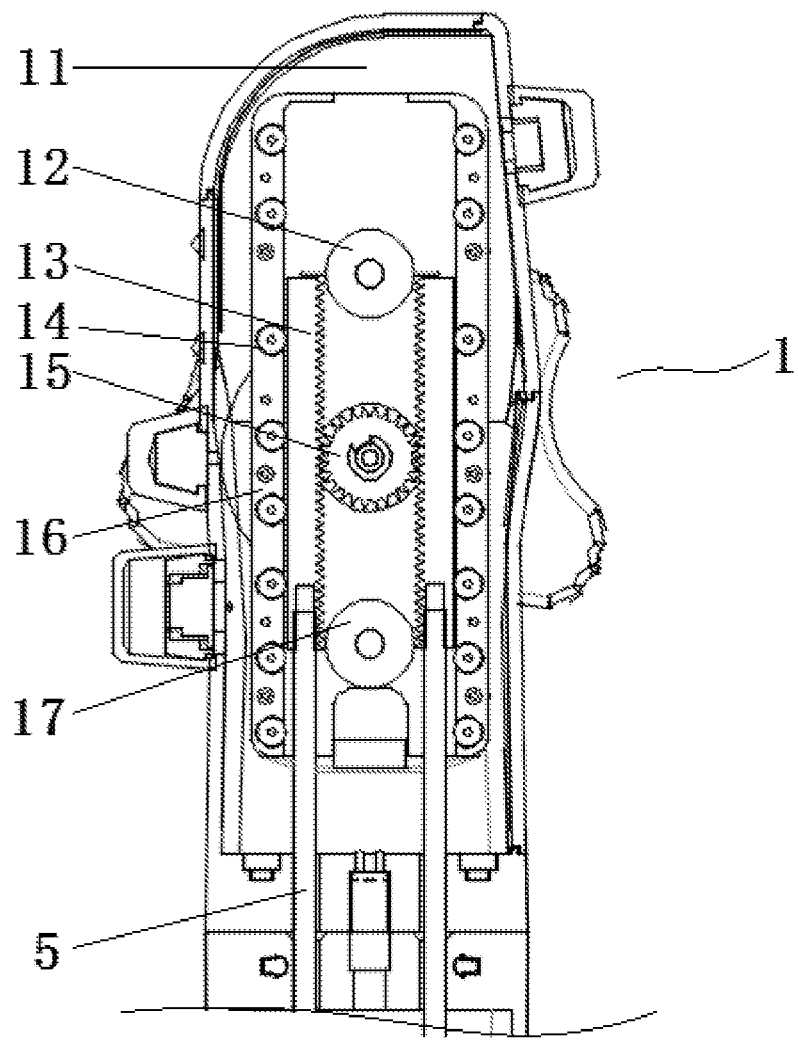
FIG. 2 is a schematic diagram of a partial inner structure of an electronic endoscope in FIG. 1, mainly illustrating an operation part.
Figure 3:
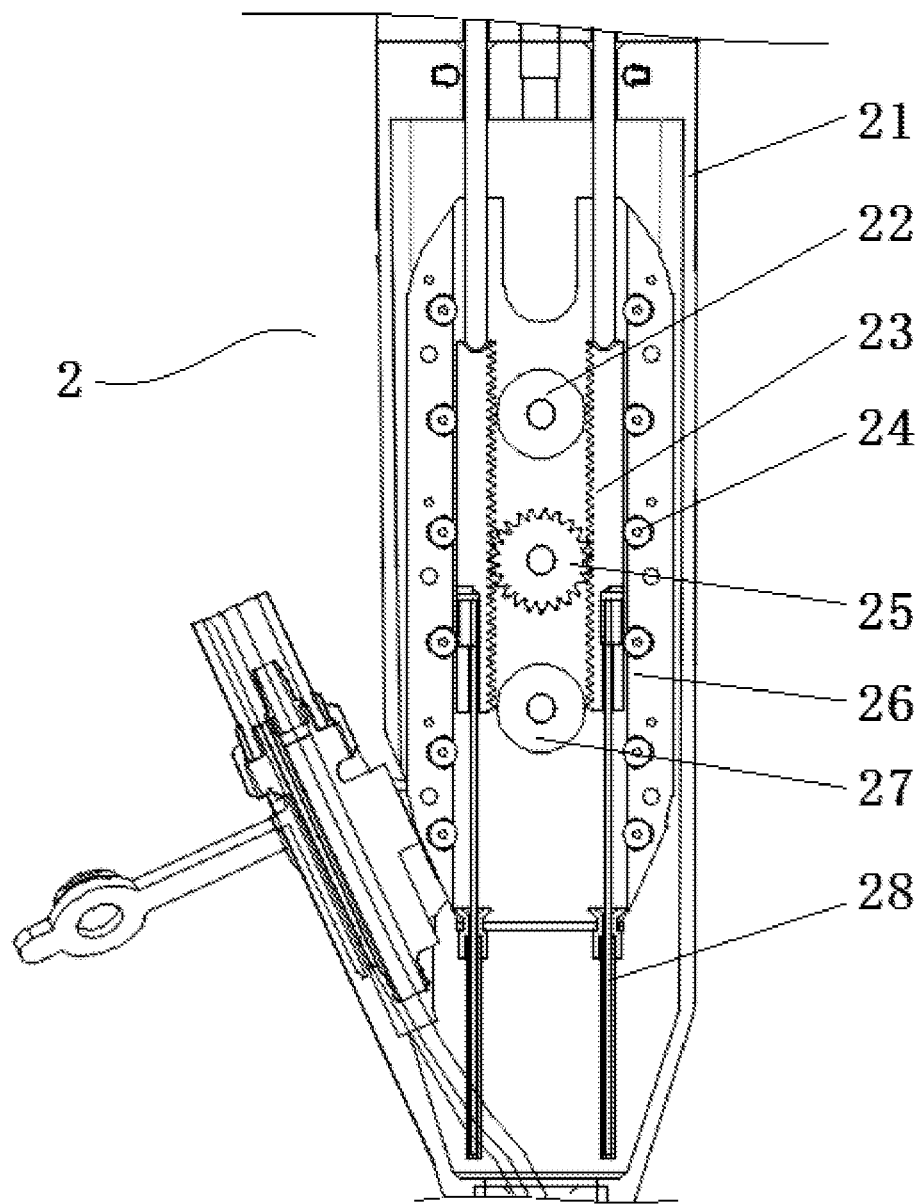
FIG. 3 is a schematic diagram of a partial inner structure of an electronic endoscope in FIG. 1, mainly illustrating an insertion part.

Referring to FIGS. 1-3, the embodiment provides an electronic endoscope, comprising an operation part 1 and an insertion part, which realize a fore-aft direction away from a human body when the electronic endoscope works, a front end of the operation part 1 is detachably connected with a rear end of the insertion part, and a front end of the insertion part is inserted into the human body first when the electronic endoscope works.

To be specific, the operation part 1 comprises an operation part shell 11, an operation part transmission located in the operation part shell 11 and a hand wheel arranged on the operation part shell 11, preferably, the operation part transmission and the hand wheel are integrated on the operation part shell 11 to integrally form the operation part 1.

To be specific, the insertion part comprises a connection portion 2, a main hose 3 and a bending portion 4 which are connected sequentially, the connection portion 2 comprises a connection portion shell 21 detachably connected with the operation part 1 and a connection portion transmission located in the connection portion shell 21, preferably, all parts in the connection portion transmission are integrated on the connection portion shell 21 to integrally form the connection portion 2.

The main hose 3 is of an elongate tubular shape and is made from elastic flexible materials such as rubber, and thus can be approximately bent to be applied to bending paths after entering the human body. A front end of the bending portion 4 is provided with a camera for collecting internal images of the human body. Thereby, parts that come into contact with the internal tissues of the human body are actually the main hose 3 and the bending portion 4.

A rear end of the connection portion shell 21 is detachably connected with a front end of the operation part 1, to be specific, the rear end of the connection portion shell 21 is detachably connected with a front end of the operation part shell 11, and a front end of the connection portion shell 21 is connected with a rear end of the main hose 3, so that the front end of the operation part 1 is detachably connected with the rear end of the insertion part. Preferably, the rear end of the connection portion shell 21 forms a pluggable connection with the front end of the operation part shell 11 through a buckle, and the rear end of the connection portion shell 21 can also form a detachable connection with the front end of the operation part shell 11 by virtue of threaded connection.

The operation part transmission includes operation part racks 13, an operation part gear 15 and an operation part rack guide roller set. The operation part gear 15 and the operation part rack guide roller set are located at two opposite sides of the operation part racks 13 respectively; to be specific, the operation part racks 13 are provided with a toothed side and a toothless side; the operation part gear 15 is located at the toothed side of the operation part racks 13 to be engaged with the operation part racks 13; and the operation part rack guide roller set is located at the toothless side of the operation part racks 13. The operation part gear 15 is rotatably supported in the operation part shell 11; the hand wheel is rotatably supported on the operation part shell 11; the hand wheel is connected with the operation part gear 15 in such a manner of converting the rotation of the hand wheel into the rotation of the operation part gear 15; for example, the hand wheel is connected with the operation part gear 15 through a shaft rotatably supported in the operation part shell 11; by this, the hand wheel may also be rotatably supported on the operation part shell 11 via the shaft. Therefrom, the rotation of the hand wheel drives the operation part gear 15 to rotate; and the rotation of the operation part gear 15 drives the operation part racks 13 engaged with the operation part gear 15 to move. The operation part rack guide roller set includes a plurality of operation part rack guide rollers 14 which are arrayed in a fore-aft direction of the operation part shell 11 and are rotatably supported in the operation part shell 11; the operation part racks 13 are slidably supported on the operation part rack guide rollers 14, that is, a tangent line on a side of an outer circle of a plurality of rollers in the same row forms a guide slide rail together moving with the operation part racks 13; thus, the movement direction of the operation part racks 13 is defined as a fore-aft direction by the operation part rack guide roller set.

The connection portion transmission includes connection portion racks 23, a connection portion gear 25 and a connection portion rack guide roller set that are connected with the operation part racks 13. The connection portion gear 25 and the connection portion rack guide roller set are located at two opposite sides of the connection portion racks 23 respectively; to be specific, the connection portion racks 23 are provided with a toothed side and a toothless side; the connection portion gear 25 is located at the toothed side of the connection portion racks 23 to be engaged with the connection portion racks 23; and the connection portion rack guide roller set is located at the toothless side of the connection portion racks 23. The connection portion gear 25 is rotatably supported in the connection portion shell; for example, the connection portion gear 25 sleeves on a shaft supported in the connection portion shell 21. The connection portion rack guide roller set includes a plurality of connection portion rack guide rollers 24 which are arrayed in a fore-aft direction of the connection portion shell 21 and are rotatably supported in the connection portion shell 21; the connection portion racks 23 are slidably supported on the connection portion rack guide rollers 24, that is, a tangent line on a side of an outer circle of a plurality of rollers in the same row forms a guide slide rail together moving with the connection portion rack 23; thus, the movement direction of the connection portion racks 23 is defined as a fore-aft direction by the connection portion rack guide roller set.

The operation part racks 13 and the connection portion racks 23 are connected in detachable and transferable fore-aft moving modes; preferably, connection members 5 are connected onto the operation part racks 13; the connection portion shell 21 is provided with holes for inserting the connection members 5; the connection members 5 are inserted into the connection portion shell 21 via the holes and then in butt joint with the connection portion racks 23. Certainly, it may also be that the connection members 5 are connected onto the connection portion racks 23; the operation part shell 11 is provided with holes for inserting the connection members 5; and the connection members 5 are inserted into the operation part shell 11 via the holes and then in butt joint with the operation part racks 13. Generally, the operation part racks 13 and the connection portion racks 23 are detachably connected in a butt joint mode.

The main hose 3 and the bending portion 4 are hollow; the control ropes 28 are connected onto the connection portion racks 23, forward pass through the main hose 3 and access into the bending portion 4, and then are connected with the connection portion racks 23 and the bending portion 4 in such a manner of converting fore-aft movement of the connection portion racks 23 into bending of the bending portion; for example, rear ends of the control ropes 28 are fixedly connected with front ends of the connection portion racks 23; front ends of the control ropes 28 are fixedly connected with a front end of the bending portion 4 (FIG. 1 only illuminates rear end portions of the control ropes 28), where "fixed connection" indicates that a position relationship between two parts connected after connection is kept unchanged, instead of defining such connection as being non-removable.

Thus, the operation part racks 13 are driven to move forward and backward by rotating the hand wheel, thereby further driving the connection portion racks 23 to move forward and backward; to be specific, the connection portion racks 23 move forward together with the operation part racks 13, and the connection portion racks 23 move backward together with the operation part racks 13; the movement of the connection portion racks 23 further drives the control ropes 28 to control the bending of the bending portion 4, thereby further controlling the exposure direction of a camera at the front end of the bending portion 4.

Thus, in the electronic endoscope provided by this embodiment, the racks and the gears are matched for the transmissions in the operation part and the insertion part, and the operation part racks in the operation part and the connection portion racks in the insertion part are connected in detachable and transferable fore-aft moving modes, thus implementing the separable design between the operation part of the electronic endoscope and the insertion part thereof. In this way, the insertion part of the electronic endoscope can be made into a disposable part to eliminate cross infection between patients. Further, the racks are used as connection parts in the operation part and the insertion part, which is simple in structure and high in connection precision relative to chain transmission.

Further, chutes are usually used for supporting the racks in mechanical design to limit the movement direction of the racks. However, in this embodiment, if the chutes in a side opposite to the gear are used for supporting the racks, the racks generate pressure towards the opposite side of the gear under the action of a pressure angle of the gear engages with the racks, thereby increasing pressure and friction force between the backs of the racks and the surfaces of the chutes. The increasing friction force causes an operator to operate the operation part (for example, a hand wheel) driving the racks to move with large force with poor operation precision, thereby affecting the operation feeling and overall treatment effect of the electronic endoscope to a great extent. Besides, theoretically, positioning by chutes may be considered as multi-point positioning; however, there is a positioning fit clearance because of transmission engagement between the gears and the racks, and thus positioning the racks by the chutes is single-point positioning under a specific condition and cannot restrict the racks to move in a fore-aft direction of the insertion part; the specific condition indicates that the racks slide to the forehand end and the rearmost end where the racks are engaged with the gears; at this time, the insides and outsides of the racks are only one-point positioning with an engagement clearance, thus the racks present an inclination condition; the sidelines of the inclined racks jack up the sidewalls of the chutes so as to block the racks and the chutes to move, so that an entire product is not able to be used with a serious consequence, a hazard to a patient during an operation and a damage to other parts of the electronic endoscope may be caused.

Therefore, in the electronic endoscope according to this embodiment, the operation part racks 13 and the connection portion racks 23 form rolling friction with the parts for limiting the movement direction thereof (operation part rack guide roller set and connection portion rack guide roller set), thereby being conducive to controlling operating force and improving operation precision and reliability with respect to a hand wheel so as to improve the operation feeling and overall treatment effect of the electronic endoscope. Of course, in the electronic endoscope according to this embodiment, the insertion part may be also in combination with other operation parts 1; only the insertion part may be also conducive to separable design between the operation part of the electronic endoscope and the insertion part thereof, which is simple in structure and high in connection precision relative to a chain transmission; in addition, the connection portion racks 23 form rolling friction with the parts for limiting the movement direction thereof (connection portion rack guide roller set), thereby being conducive to controlling operating force and improving operation precision and reliability with respect to a hand wheel so as to improve the operation feeling and overall treatment effect of the electronic endoscope.

More specifically, in this embodiment, the operation part transmission further includes operation part roller supporting grooves 16 secured in the operation part shell 11; the plurality of operation part rack guide rollers 14 are rotatably supported in the operation part roller supporting grooves 16 (for example, the operation part rack guide rollers 14 are supported in the operation part roller supporting grooves 16 through pins), thereby being rotatably supported in the operation part shell 11; it may be understood that a part of the operation part rack guide rollers 14 is protruded from the operation part roller supporting grooves 16 to contact with the operation part racks 13. Preferably, the operation part roller supporting grooves 16 are of side-opened grooves that are surrounded by a base plate and two lateral plates; the arrangement direction of the lateral plates is parallel to the axis direction of the operation part gear 15; one end of the lateral plates, far away from the operation part racks 13, is connected with the base plate; the operation part rack guide rollers 14 are mounted at a middle position between the lateral plates, do not contact with the lateral plates, and directly align at the operation part racks 13 (to be specific, in a direction parallel to the axis direction of the operation part gear 15, the central planes of the operation part rack guide rollers 14 and the central planes of the operation part racks 13 are located in the same plane), so that the operation part rack guide rollers 14 are ensured to rotate smoothly without an obstruction to move the racks.

In this embodiment, the distance of two operation part rack guide rollers 14 that are selected from all operation part rack guide rollers 14 in an operation part rack guide roller set and located on front and rear ends covers the strokes of the operation part racks 13; that is to say, the rear ends of the operation part racks 13 still contact with one of the operation part rack guide rollers 14 when moving to a rearmost position; and the front ends of the operation part racks 13 still contact with the other of the operation part rack guide rollers 14 when moving to a foremost position. Thus, it can also be understood that the operation part racks 13 do not contact with all operation part rack guide rollers 14 in an operation part rack guide roller set simultaneously.

In this embodiment, the operation part rack guide rollers 14 are preferably bearings which are secured in the operation part roller supporting groove 16 via the shaft; each bearing has an inner diameter of an inner race as 1.5 mm, an outer diameter of an outer race as 3 mm and a thickness as 3 mm, and a distance between every two adjacent bearings is in a range of 10 to 20 mm. Moreover, the bearings are made of stainless steel. More specifically, in this embodiment, the connection portion transmission further includes connection portion roller supporting grooves 26 secured in the connection portion shell 21; the plurality of connection portion rack guide rollers 24 are rotatably supported in the connection portion roller supporting grooves 26 (for example, the connection portion rack guide rollers 24 are supported in the connection portion roller supporting grooves 26 through pins), thereby being rotatably supported in the connection portion shell 21; it may be understood that a part of the connection portion rack guide rollers 24 is protruded from the connection portion roller supporting grooves 26 to contact with the connection portion racks 23.

Preferably, the connection portion roller supporting grooves 26 are of side-opened grooves that are surrounded by a base plate and two lateral plates; the arrangement direction of the lateral plates is parallel to the axis direction of the connection portion gear 25; one end of the lateral plates, far away from the connection portion racks 23, is connected with the base plate; the connection portion rack guide rollers 24 are mounted at a middle position between the lateral plates, do not contact with the lateral plates, and directly align at the connection portion racks 23 (to be specific, in a direction parallel to the axis direction of the connection portion gear 25, the central planes of the connection portion rack guide rollers 24 and the central planes of the connection portion racks 23 are located in the same plane), so that the connection portion rack guide rollers 24 are ensured to rotate smoothly without an obstruction to move the racks.

In this embodiment, the distance of two connection portion rack guide rollers 24 that are selected from all connection portion rack guide rollers in a connection portion rack guide roller set and located on front and rear ends covers the strokes of the connection portion rack guide rollers 24; that is to say, the rear ends of the connection portion racks 23 still contact with one of the connection portion rack guide rollers 24 when moving to a rearmost position; and the front ends of the connection portion racks 23 still contact with the other of the connection portion rack guide rollers 24 when moving to a foremost position. Thus, it can also be understood that the connection portion racks 23 do not contact with all connection portion rack guide rollers 24 in a connection portion rack guide roller set simultaneously.

In this embodiment, the connection portion rack guide rollers 24 are preferably bearings which are secured in the connection portion roller supporting grooves 26 via the shaft. Each bearing has an inner diameter of an inner race as 1.5 mm, an outer diameter of an outer race as 3 mm and a thickness as 3 mm, and a distance between every two adjacent bearings is in a range of 10 to 20 mm. Moreover, the bearings are made of stainless steel.

Of course, the present invention is not restricted to support the operation part rack guide rollers 14 and the connection portion rack guide rollers 24 correspondingly by using the operation part roller supporting grooves 16 and the connection portion roller supporting grooves 26; the operation part rack guide rollers 14/the connection portion rack guide rollers 24 are supported in the operation part shell/the connection portion shell separately or integrally supported therein by using supports.

Further, in this embodiment, the operation part 1 further includes: a first limiting member 12 of the operation part and a second limiting member 17 of the operation part secured in the operation part shell 11, the first limiting member of the operation part and the second limiting member of the operation part are respectively located at the rear and front sides of the operation part gear 15 and define the operation part racks 13 to move in a fore-aft moving direction. Preferably, the first limiting member 12 of the operation part and the second limiting member 17 of the operation part are rollers rotatably supported in the operation part shell 11, the axes of the rollers are parallel to an axis of the operation part gear 15; the distance between the axes of the rollers and the operation part racks 13 are equal to that between the axis of the operation part gear 15 and the operation part racks 13, and the outer diameters of the rollers are equal to a diameter of a dedendum circle of the operation part gear 15. More preferably, the first limiting member 12 of the operation part and the second limiting member 17 of the operation part are bearings, and each bearing has an inner diameter of an inner race as 4 mm, an outer diameter of an outer race as 12 mm and a thickness as 4 mm, which is made of stainless steel. Of course, the invention is not restricted to this, one of the limiting members may be either a roller or a bearing.

Further, in this embodiment, the connection portion 2 further includes: a first limiting member 22 of the connection portion and a second limiting member 27 of the connection portion secured in the connection portion shell 21, the first limiting member of the connection portion and the second limiting member of the connection portion are respectively located at rear and front sides of the connection portion gear 25 and define the connection portion racks 23 to move in a fore-aft moving direction. Preferably, the first limiting member 22 of the connection portion and the second limiting member 27 of the connection portion are rollers rotatably supported in the connection portion shell 21, and the axes of the rollers are parallel to an axis of the connection portion gear 25; the distance between the axes of the rollers and the connection portion racks 23 are equal to that between the axis of the connection portion gear 25 and the connection portion racks 23, and the outer diameters of the rollers are equal to a diameter of a dedendum circle of the connection portion gear 25. More preferably, the first limiting member 22 of the connection portion and the second limiting member 27 of the connection portion are bearings, and each bearing has an inner diameter of an inner race as 4 mm, an outer diameter of an outer race as 12 mm and a thickness as 4 mm, which is made of stainless steel. Of course, the invention is not restricted to this, one of the limiting members may be either a roller or a bearing.

Thus, the first limiting member 12 of the operation part, the second limiting member 17 of the operation part, the first limiting member 22 of the connection portion and the second limiting member 27 of the connection portion are used for positioning the operation part racks 13/the connection portion racks 23 with the support of the operation part gear 15/the connection portion gear 25, so that the racks do not tilt due to the single-point clearance fit positioning of the gears when sliding to extreme positions of front and rear ends and the racks and the chutes or the gears in the chutes are not blocked; therefore, the smooth driving and accurate positioning of the racks is ensured by the gears.

Further, referring to FIGS. 1-3, in this embodiment, two sides of one operation part gear 15 are provided with one of the operation part racks 13 engaged with the operation part gear 15, respectively; the operation part racks 13 are provided with a supporting operation part rack guide roller set, respectively; two operation part racks 13, located on two sides of the operation part gear 15, share one first limiting member 12 of the operation part and one second limiting member 17 of the operation part. Accordingly, two sides of one connection portion gear 25 are provided with one of the connection portion racks 23 engaged with the connection portion gear 25, respectively; the connection portion racks 23 are provided with a supporting connection portion rack guide roller set and the control ropes 28, respectively; two connection portion racks 23, located on two sides of the connection portion gear 25, share one first limiting member 22 of the connection portion and one second limiting member 27 of the connection portion. Two operation part racks 13, located on two sides of one operation part gear 15, are correspondingly connected with two connection portion racks 23 located on two sides of one connection portion gear 25. Thus, when the operation part gear 15 rotates, two operation part racks 13 move toward an opposite direction, thereby causing two connection portion racks 23 to move toward an opposite direction; accordingly, two control ropes 28 form tight and loose driving with respect to the bending portion 4. Through such configuration, the bending portion 4 is more flexible and stable in bending and driving.

Preferably, a complete set of transmission system is composed of one hand wheel, one first limiting member 12 of the operation part, two operation part racks 13, two operation part rack guide roller sets, one operation part gear 15, two operation part roller supporting grooves 16, one second limiting member 17 of the operation part, one first limiting member 22 of the connection portion, two connection portion racks 23, two connection portion rack guide roller sets, one connection portion gear 25, two connection portion roller supporting grooves 26, one second limiting member 27 of the connection portion, two control ropes 28 and two connection members 5; two complete sets of transmission systems are provided for the embodiment of the present invention and superposed in an axis direction of the connection portion gear 25 as shown in FIG. 1; in the foregoing transmission systems, the axes of two operation part gears 15 are mutually perpendicular, and those of two connection portion gears 25 are also mutually perpendicular; other parts are arranged relative to the operation part gears 15 and the connection portion gears 25, so that different rotations of the bending portion 4 are realized in four directions so as to better peep locations in different directions.

Further, in this embodiment, the operation part 1 and the insertion part include a circuit and an optical path, respectively; the circuits thereof are connected detachably (for example, in a plugging manner); and the optical paths are connected in an optical transfer manner (for example, a butt joint manner). The circuit of the insertion part is connected with a camera to transmit image signals; and the optical path of the insertion part extends to the front end of the bending portion 4, for the purpose of illumination.

Further, the connection portion shell 21 is provided with pipe inlets 29 including four independent inlets; and the positions from the inlets to the inner part of the connection portion 2 and the bending portion 4 are respectively provided with a gas supply passage for delivering gas into a human body, a first water supply passage for delivering water into a human body to clean a location to be clearly peeped, a second water supply passage for delivering water into a camera to achieve camera cleaning, and an attraction passage for discharging foreign matters in a human body, which form outlets on the bending portion 4.

It needs to be understood that the descriptions for specific embodiments of the present invention are only intended to illustrate the technical route and characteristics of the present invention, with the purpose of enabling those skilled in the art to understand and implement the summary of the present invention; however, the present invention is not restricted to the above specific implementations. Any change or modification within the scope of the claims of the present invention shall fall within the protection scope of the present invention.

The invention claimed is:

1. An insertion part of an electronic endoscope, characterized by comprising a connection portion, a main hose and a bending portion which are connected sequentially, a front end of the bending portion is provided with a camera, and the connection portion comprises a connection portion shell and a connection portion transmission located in the connection portion shell, wherein a rear end of the connection portion shell is detachably connected with an operation part of the electronic endoscope, and a front end of the connection portion shell is connected with a rear end of the main hose;

the connection portion transmission comprises connection portion racks as well as a connection portion gear and a connection portion rack guide roller set which are respectively located at opposite sides of the connection portion racks, the connection portion gear is rotatably supported in the connection portion shell, and the connection portion racks are engaged with the connection portion gear; the connection portion rack guide roller set comprises a plurality of connection portion rack guide rollers which are arrayed in a fore-aft direction of the connection portion shell and are rotatably supported in the connection portion shell, and the connection portion racks are slidably supported on the connection portion rack guide rollers;

each connection portion rack has disposed thereon a control rope, and the control ropes pass through the main hose and are connected with the connection portion racks and the bending portion in such a manner of converting fore-aft movement of the connection portion racks into bending of the bending portion;

the connection portion transmission further comprises connection portion roller supporting grooves secured in the connection portion shell, and the plurality of connection portion rack guide rollers are rotatably supported in the connection portion roller supporting grooves;

for the plurality of connection portion rack guide rollers, a distance between the connection portion rack guide rollers located at front and rear ends covers a stroke of the connection portion racks;

the connection portion rack guide rollers are bearings, each bearing has an inner diameter of an inner race of 1.5 mm, an outer diameter of an outer race of 3 mm and a thickness of 3 mm, and a distance between every two adjacent bearings is in a range of 10 to 20 mm;

the connection portion racks create rolling friction with the connection portion rack guide roller set for limiting the movement direction thereof; and wherein, the connection portion further comprises:

a first limiting member of the connection portion and a second limiting member of the connection portion secured in the connection portion shell and between the connection portion racks, connection portion racks located on two sides of the connection portion gear share the first limiting member of the connection portion and the second limiting member of the connection portion, the first limiting member of the connection portion and the second limiting member of the connection portion are respectively located at rear and front sides of the connection portion gear and define the connection portion racks to move in a fore-aft moving direction, the first limiting member of the connection portion and the second limiting member of the connection portion are used for positioning the connection portion racks with the support of the connection portion gear; and the connection portion rack is configured to be connected to connection members to insert into the operation part.

2. The insertion part of the electronic endoscope according to claim 1, characterized in that the first limiting member of the connection portion and/or the second limiting member of the connection portion are rollers rotatably supported in the connection portion shell, the axes of the rollers are parallel to an axis of the connection portion gear and are equally distant from the connection portion racks, and the outer diameters of the rollers are equal to a diameter of a dedendum circle of the connection portion gear.

3. The insertion part of the electronic endoscope according to claim 2, characterized in that the first limiting member of the connection portion and/or the second limiting member of the connection portion are bearings that have an inner diameter of an inner race of 4 mm, an outer diameter of an outer race of 12 mm, and a thickness of 4 mm.

4. An electronic endoscope, characterized by comprising an operation part and the insertion part according to claim 1;

the operation part comprises an operation part shell, an operation part transmission located in the operation part shell and a hand wheel arranged on the operation part shell, wherein a front end of the operation part shell is detachably connected with a rear end of the connection portion shell;

the operation part transmission comprises operation part racks as well as an operation part gear and an operation part rack guide roller set which are respectively located at opposite sides of the operation part racks, the hand wheel and the operation part gear are connected in such a manner of converting the rotation of the hand wheel into the rotation of the operation part gear, the operation part gear is rotatably supported in the operation part shell, and the operation part racks are engaged with the operation part gear; the operation part rack guide roller set comprises a plurality of operation part rack guide rollers which are arrayed in a fore-aft direction of the operation part shell and are rotatably supported in the operation part shell, the operation part racks are slidably supported on the operation part rack guide rollers, and the operation part racks and the connection portion racks are connected in detachable and transferable fore-aft moving modes;

the operation part transmission further comprises operation part roller supporting grooves secured in the operation part shell, and the plurality of operation part rack guide rollers are rotatably supported in the operation part roller supporting grooves;

for the plurality of operation part rack guide rollers, a distance between the two operation part rack guide rollers located at front and rear ends covers a stroke of the operation part racks;

the operation part rack guide rollers are bearings, each bearing has an inner diameter of an inner race as 1.5 mm, an outer diameter of an outer race as 3 mm and a thickness as 3 mm, and a distance between every two adjacent bearings is in a range of 10 to 20 mm;

the operation part racks create rolling friction with the operation part rack guide roller set for limiting the movement direction thereof; and wherein, the operation part further comprises:

a first limiting member of the operation part and a second limiting member of the operation part secured in the operation part shell and between the operation part racks, operation part racks located on two sides of the operation part gear share the first limiting member of the operation part and the second limiting member of the operation part, the first limiting member of the operation part and the second limiting member of the operation part are respectively located at the rear and front sides of the operation part gear and define the operation part racks to move in a fore-aft moving direction, the first limiting member of the operation part and the second limiting member of the operation part are used for positioning the operation part racks with the support of the operation part gear; and the operation part racks are configured to be connected to the connection members, so that the connection members are inserted into the holes of the operation part shell and then in butt joint with the operation part racks.

5. The electronic endoscope according to claim 4, characterized in that the first limiting member of the operation part and/or the second limiting member of the operation part are rollers rotatably supported in the operation part shell, the axes of the rollers are parallel to an axis of the operation part gear and equally distant from the operation part racks, and the outer diameters of the rollers are equal to a diameter of a dedendum circle of the operation part gear.

6. The electronic endoscope according to claim 5, characterized in that the first limiting member of the operation part and/or the second limiting member of the operation part are bearings, and each bearing has an inner diameter of an inner race as 4 mm, an outer diameter of an outer race as 12 mm and a thickness as 4 mm.

\* \* \* \* \*